(12) United States Patent
Robert, Jr.

(10) Patent No.: US 9,863,556 B2
(45) Date of Patent: *Jan. 9, 2018

(54) CORROSION REDUCING MINIMUM CONTACT CLAMP FOR SUPPORTING AND SECURING TUBING

(71) Applicant: Atmar Keith Robert, Jr., Houston, TX (US)

(72) Inventor: Atmar Keith Robert, Jr., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,101

(22) Filed: Aug. 10, 2016

(65) Prior Publication Data

US 2017/0009909 A1    Jan. 12, 2017

Related U.S. Application Data

(63) Continuation-in-part of application No. 14/261,928, filed on Apr. 25, 2014, now Pat. No. 9,435,466.

(Continued)

(51) Int. Cl.
*F16L 3/223* (2006.01)
*F16L 3/10* (2006.01)

(52) U.S. Cl.
CPC ............... *F16L 3/2235* (2013.01); *F16L 3/10* (2013.01); *F16L 3/223* (2013.01)

(58) Field of Classification Search
CPC ....... F16L 3/2235; F16L 3/10; F16L 3/38223; F16L 3/1091; F16L 3/227; F16L 3/23;

(Continued)

(56) References Cited

U.S. PATENT DOCUMENTS 2,546,095 A    3/1951 Gustlin
3,037,500 A    6/1962 Daugherty
(Continued)

FOREIGN PATENT DOCUMENTS

EP    1 373 773 B1    7/2006

OTHER PUBLICATIONS

International Search Report and Written Opinion of the International Searching Authority, dated Sep. 5, 2014, in International application No. PCT/US2014/035449.

(Continued)

*Primary Examiner* — Nkeisha Smith
(74) *Attorney, Agent, or Firm* — Mattingly & Malur, PC

(57) ABSTRACT

Tubing clamps having a minimum contact area between the tubes and supporting surfaces of clamp support bodies are provided for minimizing the collection and retention of liquids at the supporting surfaces. A minimum spacing is maintained between the tubes supported by the tubing clamps while maintaining sufficient ventilation between the tubes and the clamp support bodies to permit drying of any liquids which contact the tubes and the clamp support bodies at tubing support points. This prevents electrolysis and corrosion which may be caused by liquid retention and by contact between dissimilar metals. The tubing clamps are adapted to secure tubes having differing outer diameters in a single row or in multiple rows, such as in a stacked configuration. The clamps are provided with upper and lower supports, each having matching grooves that have chamfered edges forming the upper and lower tubing contact surfaces. The supports are secured together with fasteners to clamp the tubing therebetween.

6 Claims, 7 Drawing Sheets

Related U.S. Application Data

(60) Provisional application No. 61/815,899, filed on Apr. 25, 2013.

(58) Field of Classification Search
CPC ..... F16L 3/237; F16L 3/26; F16L 3/00; F16L 3/223
USPC .......................................................... 248/68.1
See application file for complete search history.

(56) References Cited

U.S. PATENT DOCUMENTS

| | | | |
|---|---|---|---|
| 4,378,007 A | | 3/1983 | Kachadourian |
| 4,395,009 A | | 7/1983 | Bormke |
| 4,807,603 A | | 2/1989 | Yasui |
| 4,971,271 A | | 11/1990 | Sularz |
| 5,131,383 A | | 7/1992 | Juarez |
| 5,143,056 A | | 9/1992 | Yih-Jong |
| 5,542,339 A | | 8/1996 | Kaczmarczyk et al. |
| 5,709,705 A | | 1/1998 | Belcher |
| 5,941,483 A | * | 8/1999 | Baginski .................. F16L 3/22 248/68.1 |
| 5,992,802 A | * | 11/1999 | Campbell ................ H02G 3/30 248/68.1 |
| 6,019,792 A | | 2/2000 | Cauthen |
| 6,129,687 A | | 10/2000 | Powell et al. |
| 6,308,921 B1 | | 10/2001 | Borzucki |
| 6,783,101 B2 | | 8/2004 | Knotts |
| 7,500,644 B2 | | 3/2009 | Naudet et al. |
| 7,530,536 B2 | | 5/2009 | Hashimoto |
| 7,657,985 B2 | * | 2/2010 | McClure ................ B23K 31/02 248/68.1 |
| 7,806,387 B2 | | 10/2010 | Wenger et al. |
| 8,028,378 B2 | | 10/2011 | Shor et al. |
| 8,287,598 B1 | | 10/2012 | Doty |
| 8,702,044 B2 | * | 4/2014 | Railsback ............. F16L 3/2235 248/229.22 |
| 2009/0057498 A1 | | 3/2009 | Oh et al. |
| 2010/0260573 A1 | | 10/2010 | Gardner et al. |
| 2011/0309314 A1 | | 12/2011 | Thomas |
| 2012/0175473 A1 | | 7/2012 | Fraze |
| 2013/0184620 A1 | | 7/2013 | Cohen |
| 2014/0312182 A1 | | 10/2014 | Nijdam et al. |
| 2014/0346291 A1 | | 11/2014 | Booth |

OTHER PUBLICATIONS

International Preliminary Report on Patentability received in corresponding International Appln. No. PCT/US2014/035449 dated Apr. 17, 2015.

\* cited by examiner

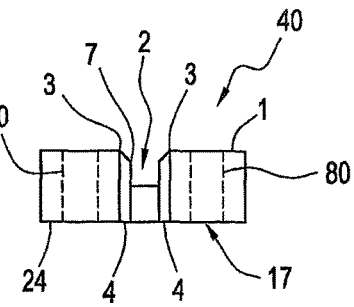
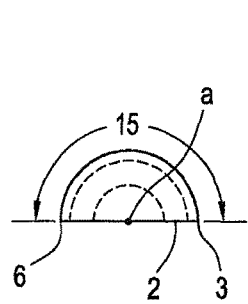
FIG. 3B  FIG. 3A
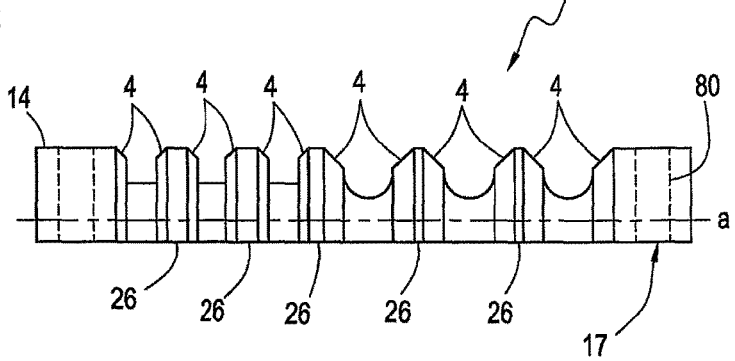
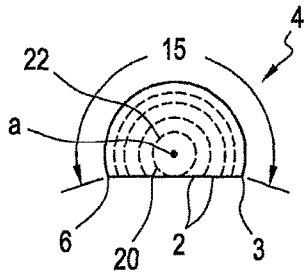
FIG. 3D  FIG. 3C
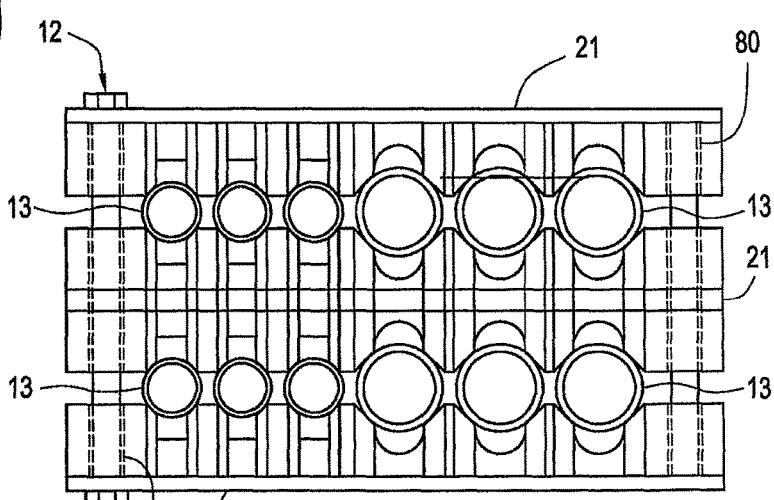
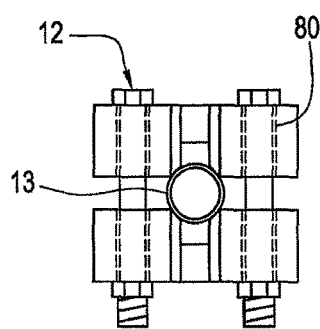
FIG. 3F
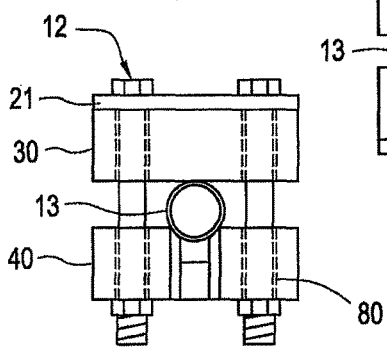
FIG. 3G  FIG. 3E

CORROSION REDUCING MINIMUM CONTACT CLAMP FOR SUPPORTING AND SECURING TUBING

CROSS REFERENCE TO RELATED APPLICATION

This application is a continuation-in-part of prior U.S. patent application Ser. No. 14/261,928, filed Apr. 25, 2014, the disclosure of which is expressly incorporated herein in its entirety by reference.

FIELD OF THE INVENTION

The present invention relates to the clamping and supporting of tubing used to transport fluids, chemicals, oils and gases in industries, such as oil and gas drilling; and production and refining, where such tubing is commonly used. Other industries using tubing include shipping, military installations and equipment, food production installations, manufacturing sites, etc. In addition, the present invention is utilizable in corrosive environments, such as marine environments, where minimum contact between tubing, and the clamps that support the tubing, is preferable in order to reduce the accumulation of moisture contacting the tubing at the support area, which contact creates a risk of pitting and corrosion of the tubing.

DESCRIPTION OF RELATED ART

Clamping systems of the prior art include solutions for solving or reducing the problems associated with electrolysis and corrosion of tubing. However, the greater the contact area between the clamping supports and the tubing, the more the contact area is likely to collect and hold moisture. Vibration isolating and insulating materials are conventionally provided between the contact surfaces of the clamp supports and the tubing. However, such additional insulating materials hold moisture. Further, spacers, such as metallic spacers, are used with conventional clamping systems to space apart a series of tubes in a row. However, all such spacers and other adjuncts constitute additional parts in the manufacture and assembly of the clamps. Accordingly, such configurations are disadvantageous with respect to the economical and efficient implementation of such clamps in clamping systems for supporting tubing of various types of materials and sizes typically found in industrial installations and that exist in potentially corrosive environments.

BRIEF SUMMARY OF THE INVENTION

It is an object of the present invention to provide a clamp or an arrangement of clamps in a clamping system that provides minimum contact between the tubing support surfaces of the clamp and the tubing to allow for ventilation which minimizes electrolysis and corrosion of the tubing while offering a compact clamping system permitting uniform configurations of a variety of tubes with equal or different diameters.

The clamps enable a number of tubes to be secured and supported within the same clamping system using one or more grooves of equal or unequal size (when supporting multiple tubes of the same OD) formed in the clamp support bodies in order to enable the tubes to seat properly with tubing engaging surfaces of the clamps and which surfaces have a minimum contact area.

Embodiments of the present invention provide a corrosion reducing minimum contact clamp comprised of cylindrically shaped bodies made from a metallic, composite or plastic material for forming upper and lower clamp support bodies for securing an individual row of tubes or a rectangular array of tubes, including one or more spaced-apart tubing accommodating grooves of a shape having spaced groove inner and outer edges that form conical frustums. The grooves can be of equal or unequal size within the same clamp support bodies in order to enable tubes of different sizes or multiple tubes of the same size to be accommodated and properly seated side by side within the same tubing clamp.

BRIEF DESCRIPTION OF THE DRAWINGS

FIG. 3A illustrates a side view of a cylindrical clamp support body according to another embodiment of the present invention and having one groove with chamfered surfaces that form contact areas with the tubing to be supported.

FIG. 3B illustrates an end view of the cylindrical clamp support body according to FIG. 3A.

FIG. 3C illustrates a side view of a cylindrical clamp support body according to another embodiment of the present invention and having multiple grooves of different dimensions with chamfered surfaces that form contact areas supporting tubing of respectively different outer diameters.

FIG. 3D illustrates an end view of the cylindrical clamp support body according to FIG. 3C.

FIG. 3E illustrates a side view of a clamp comprised of upper and lower clamp support bodies according to the embodiment of FIG. 3C and a middle clamp support body of FIG. 1E respectively supporting rows of tubes with mixed outer diameters clamped between the clamp support bodies and supported by the respective grooves with chamfered surfaces, secured by fasteners as part of a clamping assembly or system.

FIG. 3F illustrates a side view of a clamp comprised of upper and lower clamp support bodies according to the embodiment of FIG. 3A supporting a tube clamped between the clamp support bodies and supported by the respective grooves with chamfered surfaces and secured by fasteners.

FIG. 3G illustrates a side view of a clamp according to another embodiment of the invention comprised of an upper clamp support body without any grooves and a lower clamp support body of the embodiment of FIG. 3A having grooves supporting a tube clamped between the upper and lower clamp support bodies, and secured by fasteners.

DESCRIPTION OF THE PREFERRED EMBODIMENTS

Figures 1A, 1B:
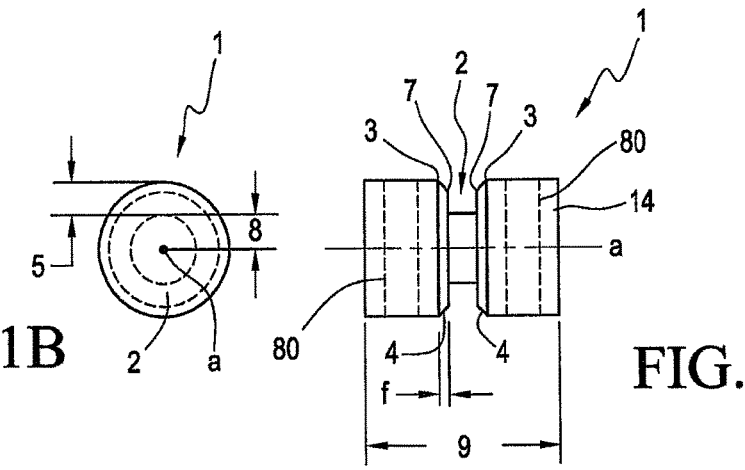
FIG. 1A illustrates a side view of a cylindrical clamp support body according to an embodiment of the present invention and having one groove with spaced inner and outer edges that define chamfered contact areas with the tubing to be supported.
FIG. 1B illustrates an end view of the cylindrical clamp support body according to FIG. 1A.

FIG. 1A shows a first preferred embodiment of a clamp support body of right circular cylindrical shape, generally at 1, and having a single circular groove 2 with features of a wedge and having groove outer edges 3 and groove inner edges 7 which are spaced apart from each other at a radial outer portion of the groove. Each pair of spaced outer and inner groove edges 3; 7 cooperate to form one of two mirrored right conical frustums 4, each such conical frustum 4 having a frustum width "f". The right conical frustums 4 each formed by the groove edges 3; 7 on one of the two sides of the groove 2 each form a wedge and are the contact surfaces for tubing, when clamped. The wedge shape prevents the tubing from shifting to either side. The conical frustums 4, each formed by one pair of the groove edges 3; 7, are each a truncated conical surface that comes in contact with the tubing, which is typically of circular shape, resulting in a minimal contact area of the clamp and tubing. A groove depth 5 of groove 2 provides a space between a circular groove base 22 of the groove 2 and the tubing. This space is required to allow ventilation for drying any liquids that might be present or which might accumulate as a result of the installation environment. In one embodiment of the present invention, a distance 8 from a longitudinal axis of symmetry "a" of the clamp support body, to the circular groove base 22 of the groove 2, which groove 2 itself has the depth 5, as shown in FIG. 1B, is not less than 0.125 inch. Overall, the length 9 of the clamp support body is not less than 1.25 inches, for example. The outer edge 3 of the right conical frustum 4 is shown having a circumference which is equal to that of the surface of greatest circumference 14 of the clamp and is the outer edge 3 of the groove 2. In the following description, a tube is used as an exemplary application. However, the present invention may be used with any cylindrical type body, such as a pipe and the like.

Figures 1C, 1D:
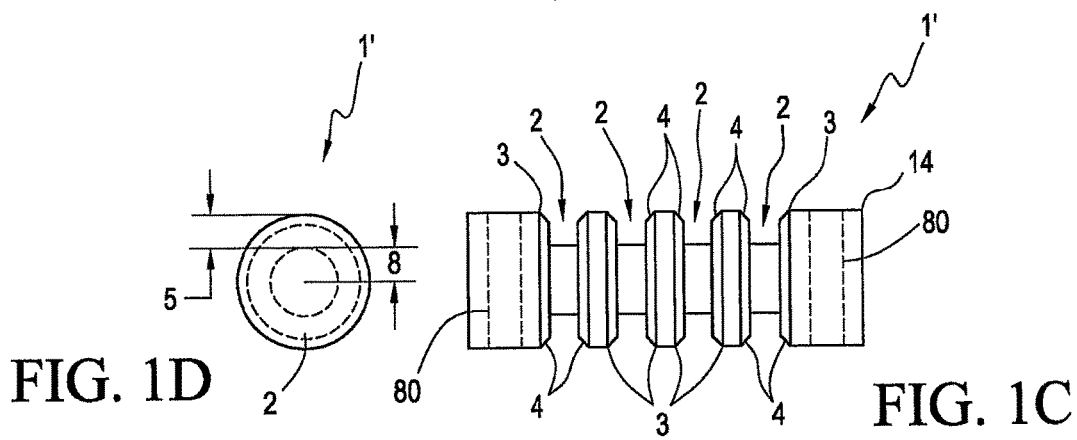
FIG. 1C illustrates a side view of a cylindrical clamp support body according to an embodiment of the present invention and having multiple grooves of the same dimensions with spaced inner and outer edges that form chamfered contact areas supporting tubing of substantially the same outer diameters.
FIG. 1D illustrates an end view of the cylindrical clamp support body according to FIG. 1C.

FIGS. 1C and 1D show a clamp support body of right circular cylindrical shape 1' that is consistent with the features of the clamp support body 1 shown in FIG. 1A, except for having multiple spaced-apart grooves 2 for clamping and supporting more than one tube of equal diameter.

Figures 1E, 1F:
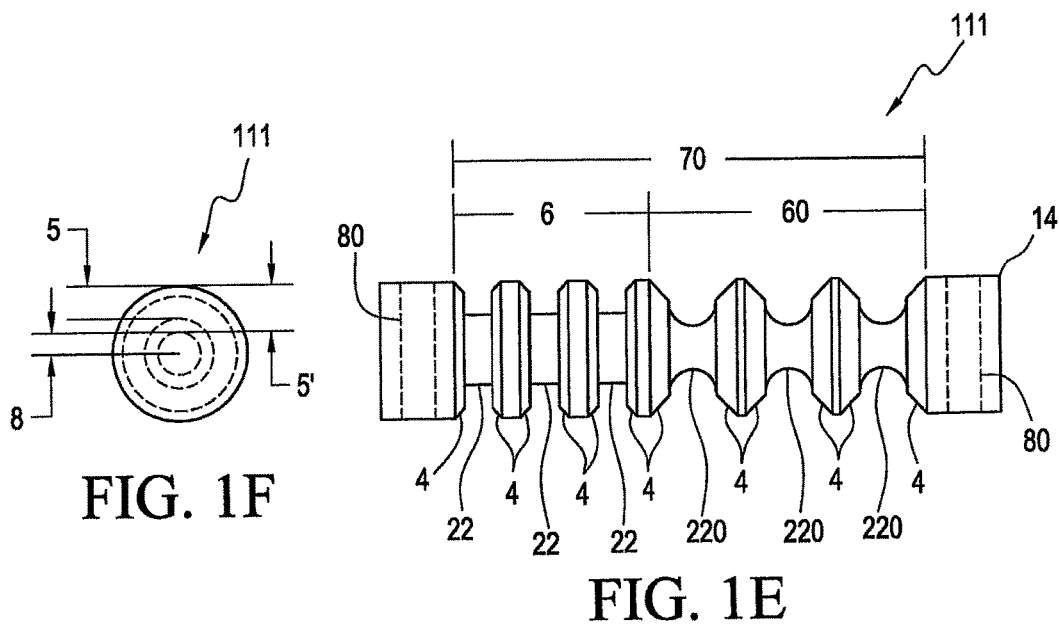
FIG. 1E illustrates a side view of a cylindrical clamp support body according to an embodiment of the present invention and having multiple grooves of different dimensions with spaced inner and outer edges that form chamfered contact areas supporting tubing of respectively different outer diameters.
FIG. 1F illustrates an end view of the cylindrical clamp support body according to FIG. 1E.

FIGS. 1E and 1F show a clamp support body of right circular cylindrical shape 111 having multiple circular grooves 2 of identical size and dimension in each of a first series of grooves 6 and a second series of grooves 60, which form a multiple series 70 of spaced-apart grooves 2. All the grooves 70 have inner and outer edges 3; 7 defining wedges formed as right conical frustums 4 in an alternating arrangement. In one embodiment of the present invention, the distance 8 from the longitudinal axis of symmetry "a" of the clamp support body to the greatest depth of the second series of grooves 60, each of which has a depth 5', is shown in the side view and is not less than 0.125 inch. The configuration of grooves shown in FIGS. 1E and 1F allows for the clamping of multiple sized tubes in the same row and side by side. The first series of grooves 6 have circular groove base 22. The second series of grooves 60 have bases 220 which are arcuate in the direction of the longitudinal axis "a", as in FIGS. 1E, 2A and 2B, for example.

Figure 1G:
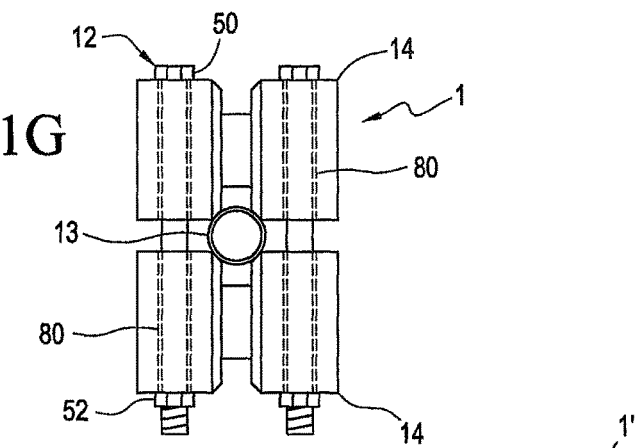
FIG. 1G illustrates a side view of a clamp comprised of upper and lower clamp support bodies according to the embodiment of FIG. 1A, having a tube clamped between them and being supported by the groove with chamfered surfaces.

FIG. 1G illustrates two clamp support bodies, generally at 1 and each with a cylindrical shape having molded shape surfaces and being held together by assembly hardware, generally at 12, such as bolts 50 and nuts 52, and clamping a single tube 13 as part of a clamp assembly.

Figure 1H:
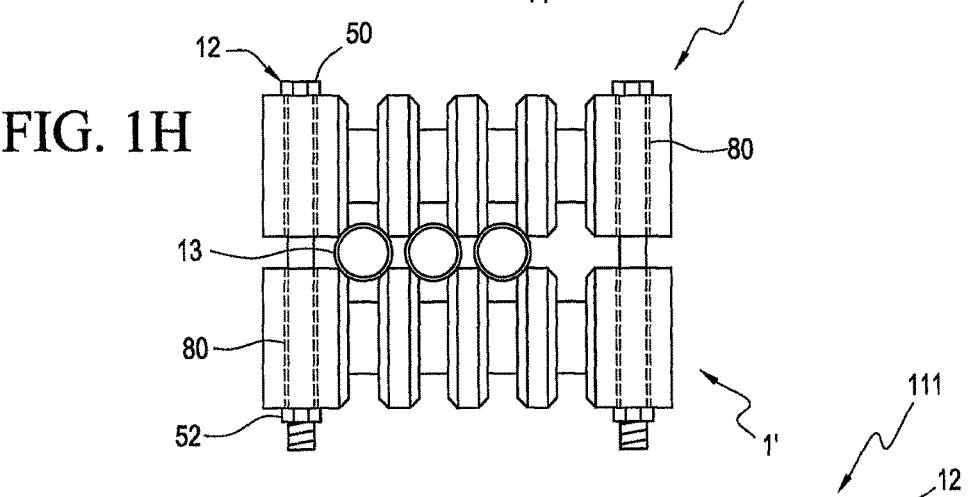
FIG. 1H illustrates a side view of a clamp comprised of upper and lower clamp support bodies according to the embodiment of FIG. 1O, having tubes clamped between them and being supported by the grooves with chamfered surfaces.

FIG. 1H illustrates two clamp support bodies of right circular cylindrical shape $1^1$ held together by assembly hardware, generally at 12, and consisting of bolts 50 and nuts 52, and clamping multiple tubes 13 of equal diameter.

Figure 1I:
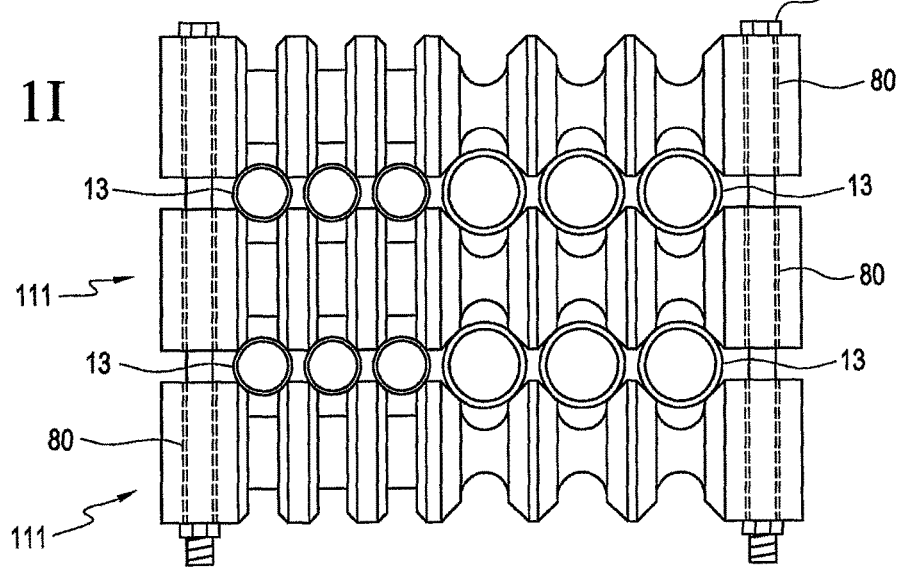
FIG. 1I illustrates a side view of a clamp comprised of upper and lower clamp support bodies according to the embodiment of FIG. 1E, having tubes of respectively different diameters clamped between them and being supported by the grooves with chamfered surfaces.

FIG. 1I illustrates three clamp support bodies of right circular cylindrical shape 111 held together by assembly hardware, generally at 12, such as bolts 50 and nuts 52, and clamping multiple series of tubing 13 of unequal diameter in a same row and in a rectangular array as part of a clamp assembly or clamp system.

Figure 2A:
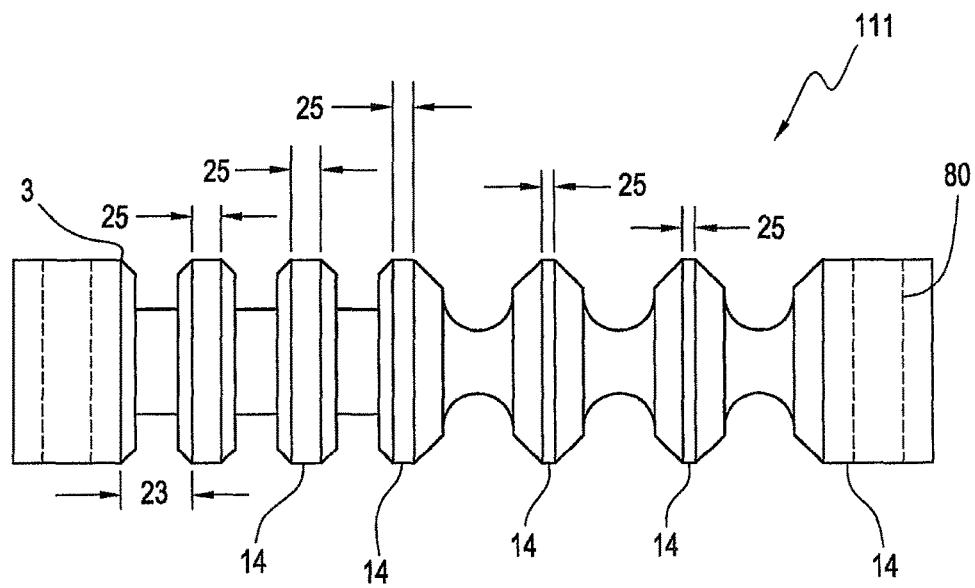
FIGS. 2A and 2B are detailed views of the cylindrical clamp support body according to the embodiment of the invention shown in FIG. 1E showing the base, chamfer angles and depth of grooves of the clamp body.

FIG. 2A illustrates the embodiment of the present invention shown in FIG. 1E in which the greatest width 23 of each groove, measured from its outer edges 3 connecting to the surface 14 with the greatest circumference of the clamp, is not less than 0.177 inch. Proportionate spacing 25 between grooves 2 forms a tightly spaced arrangement that allows for the tubing 13 to be arranged as compactly as possible while providing adequate spacing for ventilation between each tube.

Figure 2B:
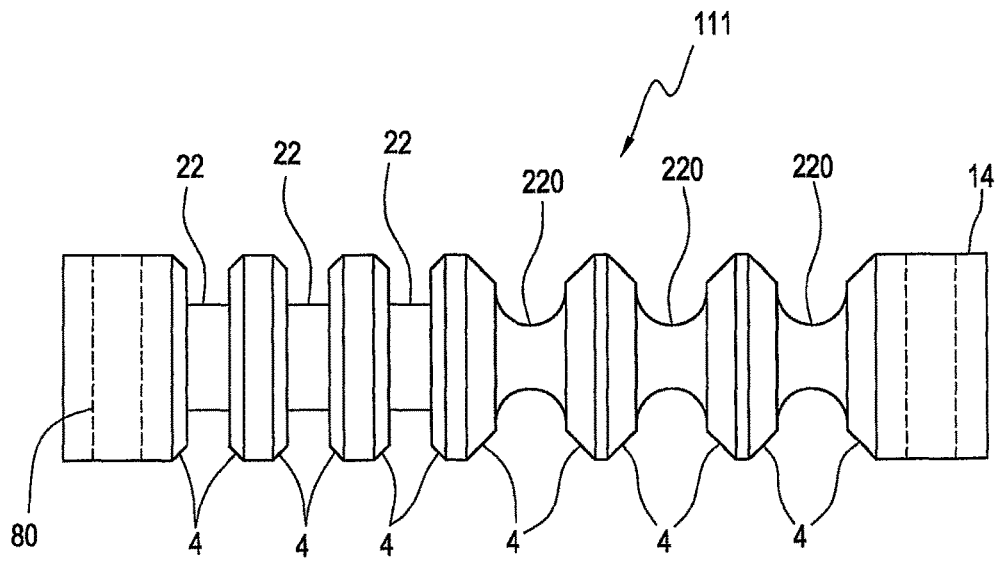

FIG. 2B illustrates a clamp support body, generally at 111, of right circular cylindrical shape showing the grooves 2 having circular groove bases 22 which are even and parallel with the axis of symmetry "a" and which are circular in a cross section. The circular groove bases 22 of the grooves 2 provide more space between tubing and clamp surface as well as a stronger base design when required. In FIG. 2B, the grooves 2 have spaced outer and inner edges 3; 7 which define right conical frustums 4 each having a cone angle which may range from 45 degrees to 85 degrees, for example, to accommodate multiple diameters of tubing. The groove bases 220, which are shown at the right of FIGS. 1E, 2A and 2B, for example are arcuate in the direction of the longitudinal axis "a".

FIGS. 3A and 3B illustrate a clamp support body of right circular cylindrical shape, generally at 40, which is bisymmetrically segmented by a single plane 17 oriented in line with the cylinder's longitudinal axis of symmetry "a". The plane 17 defines a quadrilateral base support surface 24 with the clamp support body, generally at 40, having one symmetrical groove 2 defined by spaced outer and inner edges 3; 7 forming two right conical frustum sections 4.

FIGS. 3C and 3D illustrate a clamp support body of right circular cylindrical shape, generally at 42, and which is segmented by a single plane 17 oriented parallel but offset from the cylinder's longitudinal axis of symmetry "a" to form a series of base support surfaces 26. The plane 17 in FIG. 3C segments the clamp support body, generally at 42, into unequal halves unlike the segmentation of the clamp support body, generally at 40 in FIG. 3A, and leaves the circular groove base 22 of the circular groove 2 with the circumference 20 as circular. The clamp is more rigid as a result.

In each of the clamp support bodies shown in FIGS. 3A-3D, the cylindrical segment shape of the clamp enables a more compact clamping system. The circumferential length of the grooves' outer edges 3 and the clamps' greatest circumference 14 are equal. The outer edge 3 of the right conical frustum section 4 has a circumference which is equal to the clamp surface area 14 having the greatest circumference of the clamp 6.

FIG. 3E illustrates a stack of clamp support bodies of right circular cylindrical shape with the top and bottom support bodies being segmented by a single plane which is oriented parallel to the cylinder's axis of symmetry, as shown in FIGS. 3A-3C, and the middle clamp support body being un-segmented as, for example, shown in FIGS. 2A-2B. The three clamp support bodies arrange the tubing 13 in a rectangular array with assembly hardware, generally at 12, bringing them together. The number of tubes 13 clamped in a rectangular array of tubing can be increased by adding one or more clamps on the top or bottom or by increasing the length of the clamp bodies and the number of grooves 1 in those clamp bodies.

Optionally, also shown in FIG. 3E are top and bottom backing plates 21 engaged by the fasteners, generally at 12, and providing for added support. Optionally, a middle clamp support body may comprise two of the segmented clamp support bodies each, such as the segmented clamp support body 42 shown in FIG. 3C, disposed back to back and having a single backing plate 21 therebetween.

FIG. 3F illustrates two clamp support bodies of right circular cylindrical shape 1 and each segmented by a single plane oriented parallel to the cylinder's longitudinal axis of symmetry "a", as depicted in FIG. 3A. These two clamp support bodies are used to clamp and to support a single tube 13, using the assembly hardware, generally at 12.

FIG. 3G illustrates a side view of a clamp according to another embodiment of the invention in which an upper cylindrical clamp support body 30 without any grooves and a lower clamp support body 40 segmented by a single plane and having a groove 12, as shown in the embodiment of FIG. 3A, support a tube 13 clamped therebetween. The upper cylindrical clamp support body 30, without grooves, is a cylindrical rod. The upper backing plate 21 and the lower clamp support body 40 are secured by fasteners, generally at 12. In this way, a three point support system is provided for supporting the tubing, i.e. using a clamp support body 40 having grooves providing two support points and an upper cylindrical support body 30 providing a third support point.

The tubing clamp assemblies of FIGS. 1G, 1H, 1I and 3E can also be modified to include an upper or lower cylindrical clamp support body 30 without grooves in place of a clamp support body having grooves, in order to provide the three point contact support shown in FIG. 3G, with or without the use of additional backing plate(s) 21 as shown in FIG. 3E. Further, for applications in which there are different sized tubing 13 being accommodated in the three point support configuration, the depth of the grooves 2 may be adjusted on the grooved clamp support body to ensure that the top surface of each of the different OD tubes 13 engages the upper clamp body in a straight line, substantially parallel to the longitudinal axis of symmetry "a". Alternatively, the upper clamp support body may have a step profile where the stepped part accommodates the tubes 13, each having a different OD, when tubes 13 of different diameters are accommodated together in a row of a three point clamp configuration.

Figures 4A, 4B:
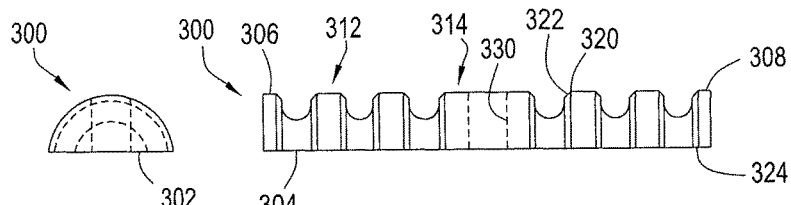
FIG. 4A is an end view of a cylindrical clamp support body in accordance with another embodiment of the present invention.
FIG. 4B is a side elevation view of the cylindrical clamp support body of FIG. 4A.
Figure 4C:
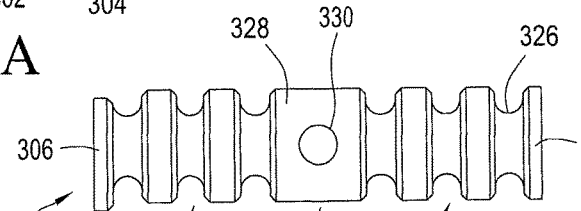
FIG. 4C is a top plan view of the cylindrical clamp support body of FIG. 4A.

Referring now to FIG. 4A, there may be seen, generally at 300, another preferred embodiment of the cylindrical clamp support body in accordance with the present invention. As were the previously described embodiments, the embodiment of the present invention, as depicted at 300 in FIG. 4A, has a right circular cylindrical shape, similar to the shape of the clamp support body depicted in FIGS. 3A and 3B. The clamp support body, generally at 300, is longitudinally segmented by a single plane 302. The plane 302 defines a quadrilateral base support surface 304. The cylindrical clamp support body, generally at 300, is defined by spaced ends 306; 308, a plurality of circular grooves 312, as seen in FIGS. 4B and 4C and a land 314 which is intermediate the spaced ends 306, 308 and which divides the cylindrical clamp support body 300 into left and right cylindrical clamp support body sections 316 and 318, respectively. In the embodiment depicted in FIGS. 4A, 4B and 4C, the left and right cylindrical clamp support sections 316 and 318 are of equal length and the land 314 is equidistant from the left and right cylindrical clamp support body ends 306 and 308. While that configuration is a preferred one, it will be understood that the lengths of the left and right cylindrical clamp support body sections 316 and 318 are not necessarily equal. One of the sections can be longer or shorter, than the other section.

The right circular cylindrical clamp support body depicted generally at 300 in FIGS. 4A, 4B and 4C includes the plurality of grooves 312. It will be understood that each of these grooves 312 is generally similar to the grooves depicted and disclosed in the various prior embodiments. Each such groove 312 is defined by a groove outer edge 320 and a groove inner edge 322. These groove edges 320; 322 define between them a right truncated conical surface 324. That right truncated conical surface 324 provides a support surface of minimum contact area to support a tube, generally at 13, as was discussed previously, and as will be seen in FIGS. 7A and 7B, for example. In the embodiment of the clamp support body depicted generally at 300 in FIGS. 4A, 4B and 4C, the groove base 326 of each of the circular grooves 312 is an annular groove base 326, generally similar to the annular groove bases 220 depicted at the right of the cylindrical clamp support body 111 depicted in FIG. 1E. While these groove bases 326 could also be circular groove bases, such as the ones depicted at 22 in FIG. 1E, it has been found that the arcuate groove bases, such as the ones depicted at 326 in FIGS. 4A, 4B and 4C provide greater strength for the clamp support body, generally at 300.

The intermediate land, generally at 314 of the cylindrical clamp support body 300 of the embodiment of the present invention depicted at FIGS. 4A, 4B and 4C, has a land surface 328 of greatest circumference, which circumference is essentially the same as the circumferential surface 14 of the previously described preferred embodiments of the present invention. A fastener receiving hole 330 is formed in the intermediate land, generally at 314, and is the same in function as the fastener receiving holes depicted at 80 in the previously described embodiments of the present invention. The fastener receiving hole 330 extends from the surface of greatest circumference 328 of the intermediate land 314 to the plane 312 and has a hole axis which is generally perpendicular to the plane 302 which defines the quadrilateral base support surface 304.

Figure 7A:
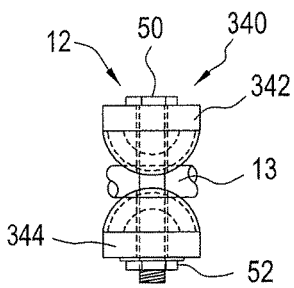
FIG. 7A is an end view of a clamp utilizing two of the cylindrical clamp support bodies in accordance with FIG. 4A.
Figure 7B:
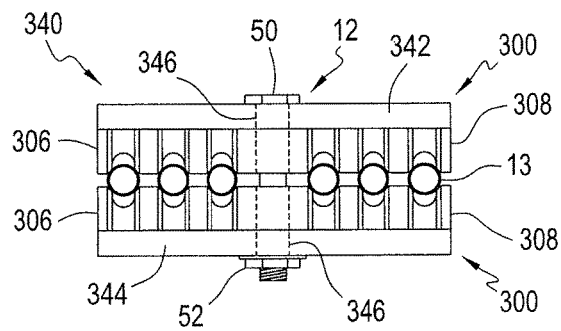
FIG. 7B is a side elevation view of the clamp depicted in FIG. 7A.

Turning now to FIGS. 7A and 7B, there may be seen, generally at 340, a clamp for use to support a plurality of tubes, generally at 13, which clamp 340 is configured using two of the cylindrical clamp support bodies 300 depicted in FIGS. 4A, 4B and 4C. A top backing plate 342 is placed into engagement with the plane 302 which is now located at an upper portion of the now inverted upper cylindrical clamp support body 300. A similar bottom backing plate 344 is placed beneath the lower cylindrical clamp support body 300. Each of these top and bottom backing plates 342; 344 is provided with a backing plate fastener receiving hole 346. These backing plate fastener receiving holes 346 are each formed in their respective backing plate 342; 344 to be in alignment with a respective one of the fastener receiving holes 330 which are formed in each intermediate land 314 of each of the two circular clamp support bodies 300. When the clamp 340 is assembled, as depicted in FIGS. 7A and 7B, suitable assembly hardware 12, such as a bolt 50 and a nut 52, can be utilized to secure the two cylindrical clamp support bodies 300 together to clamp a plurality of tubes 13 therebetween.

In the embodiment of the present invention depicted in FIGS. 4A, 4B, 4C, 7A and 7B, the primary difference between this embodiment and the previously disclosed and depicted embodiments is the location of the intermediate land 314 intermediate the ends 306 and 308 of each cylindrical clamp support body 300, and the presence of a fastener receiving hole 330 in each such intermediate land 314. As compared with the clamps depicted in FIGS. 3E, 3F and 3G, for example, the use of an intermediate land 314, with its associated fastener receiving hole 330 for each cylindrical clamp support body 300, makes the assembly of the clamp depicted at 340 in FIGS. 7A and 7B more expeditious than the assembly of a generally similar clamp depicted in FIGS. 3E, 3F and 3G. While not specifically depicted, it will also be understood that it is within the scope of the present invention to provide an embodiment of the cylindrical clamp support body, which is not specifically shown, and which could be provided with fastener receiving holes 80 in one or both ends and which also can be provided with the fastener receiving hole 330 in an intermediate land 314. Such a cylindrical clamp support body would provide a component of a clamp that would be usable in situations where greater clamping strength than could be provided by either of the clamp embodiments with a fastener hole in an intermediate land, or with fastener holes in one or both of the ends could provide.

Figure 8A:
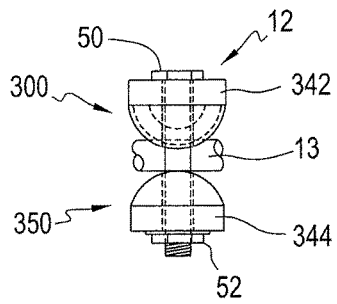
FIG. 8A is an end view of a clamp in accordance with the present invention and utilizing one of the cylindrical clamp support bodies depicted in FIG. 4A and a cylindrical clamp rod.
Figure 8B:
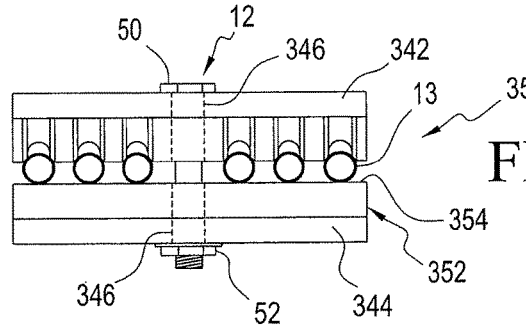
FIG. 8B is a side elevation view of the clamp depicted in FIG. 8A.

FIGS. 8A and 8B show another embodiment of a clamp, generally at 350, which is configured utilizing one of the cylindrical clamp support bodies, generally at 300, in FIGS. 4A, 4B and 4C. Instead of using two such cylindrical clamp support bodies 300, as is depicted in FIGS. 4A, 4B and 4C, in the embodiment of the clamp 350, in accordance with the present invention, as depicted in FIGS. 8A and 8B, one of the components is a cylindrical clamp support body 300, while the other component is a cylindrical clamp support rod, generally at 352. In this clamp configuration, the cylindrical clamp support rod 352 has a smooth circumferential outer surface 354. That smooth circumferential outer surface 354 of the cylindrical clamp support rod 352 is devoid of any grooves, groove edges or chamfered support surfaces. When a tube or tubes 13 are held in this clamp, generally at 350, they are held using essentially a three point contact, as opposed to the four point contact, as depicted in FIGS. 7A and 7B. The cylindrical clamp support body, generally at 300, which is the same as each of the cylindrical clamp support bodies depicted in FIGS. 4A, 4B and 4C, provides two points of contact between the clamp support body 300 and a clamped tube 13. These are the two right truncated conical support surfaces 324 defined by the spaced outer and inner edges 320; 322 of each cylindrical groove 312. The third contact point is provided by the smooth circumferential surface 354 of the cylindrical clamp support rod 352 which forms the second member of the clamp 350 in accordance with the present invention, as depicted in FIGS. 8A and 8B. Other than the absence of the spaced cylindrical grooves 312, the cylindrical clamp support rod 352 of the embodiment of the present invention, as depicted in FIGS. 8A and 8B, is essentially the same as the embodiment depicted in FIGS. 7A and 7B. The clamp 360 of FIGS. 8A and 8B is less expensive than the clamp 340 of FIGS. 7A and 7B since the cylindrical clamp support rod 352 is less expensive to manufacture.

Figures 5A, 5B:
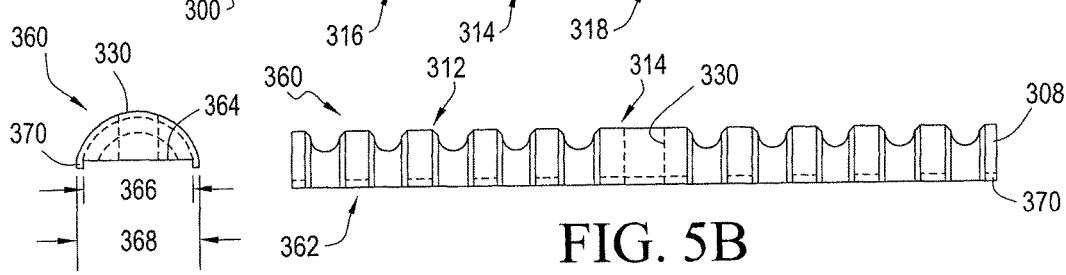
FIG. 5A is an end view of another preferred embodiment of a cylindrical clamp support body in accordance with the present invention.
FIG. 5B is a side elevation view of the cylindrical clamp support body of FIG. 5A.
Figure 5C:
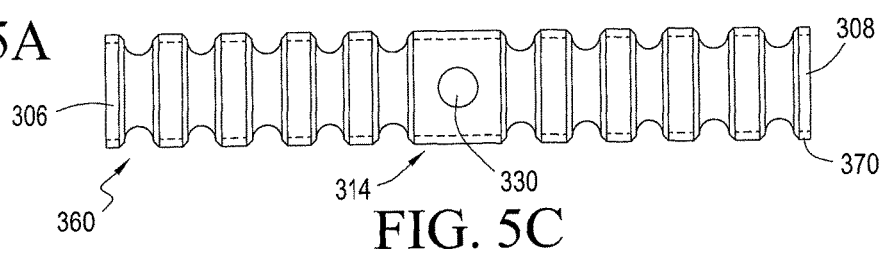
FIG. 5C is a top plan view of the cylindrical clamp support body of FIG. 5A.

A further preferred embodiment of the cylindrical clamp support body, in accordance with the present invention, is depicted generally at 360 in FIGS. 5A, 5B and 5C. This further preferred embodiment of a cylindrical clamp support body 360 is generally the same as the preferred embodiment depicted at 300 in FIGS. 4A, 4B and 4C. Similar reference numerals will be utilized to identify corresponding features in both. In the cylindrical clamp support body 360 depicted in FIGS. 5A, 5B and 5C, the quadrilateral base support surface 304 of the FIGS. 4A, 4B and 4C embodiment is modified in the FIGS. 5A, 5B and 5C embodiment. The base support surface, generally at 362 of the cylindrical clamp support body 360 of the embodiment depicted in FIGS. 5A, 5B and 5C, instead of being planar, is instead formed with an elongated backing plate receiving channel 364 which extends the length of the cylindrical clamp support body 360. The cylindrical backing plate receiving channel 364 has a channel width 366 which is less than the overall width 368 of the clamp base surface, generally at 304. A pair of outer channel flanges 370 are contiguous with the surface of greatest circumference 328 of the cylindrical clamp support body 360 depicted in FIGS. 5A, 5B and 5C. In all other aspects, the cylindrical clamp support body 360 is the same as the cylindrical clamp support body 300 depicted in FIGS. 4A, 4B and 4C. While the overall length of the cylindrical clamp support body 360 is greater than an overall length of the clamp support body 300, this is not a substantial difference. The cylindrical clamp support bodies, in accordance with the present invention, can be provided in various structural lengths. If necessary, a cylindrical clamp support body can be made shorter by severing the clamp support body in a surface of greatest circumference or in a groove, by accomplishing a generally conventional cutting process.

Figure 9A:
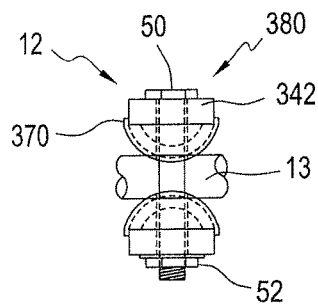
FIG. 9A is an end view of a clamp utilizing two the cylindrical clamp support bodies depicted in FIG. 5A in accordance with the present invention.
Figure 9B:
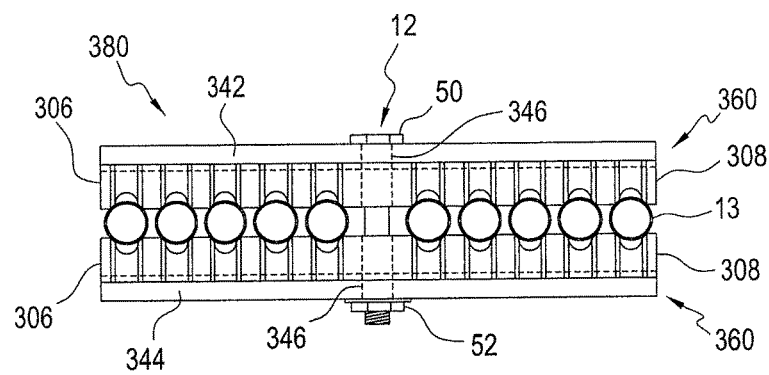
FIG. 9B is a side elevation view of the clamp depicted in FIG. 9A.

Turning to FIGS. 9A and 9B, there may be seen a clamp, generally at 380, which is comprised of two of the cylindrical clamp support bodies 360 depicted in FIGS. 5A, 5B and 5C and each utilizing the backing plate receiving channel, generally at 364. As seen in FIGS. 9A and 9B, the top and bottom backing plates 344; 346 respectively are now received in the cooperatively shaped backing plate receiving channels 364 of the two cylindrical clamp support bodies 360 of this preferred embodiment. Once the two cylindrical clamp support bodies 360 have been positioned to engage a number of tubes 13 to be clamped, the top and bottom backing plates 342; 344 are placed in their respective channels 364 and suitable fastening hardware, generally at 12, is used to clamp the two clamp support bodies 360 in place. The provision of the backing plate receiving channels 364 in each of the cylindrical clamp support bodies 360, in accordance with this preferred embodiment of the present invention, as depicted in FIGS. 5A, 5B and 5C, as well as in FIGS. 9A and 9B, prevents any shifting or rotation of the backing plates 342, 344 during assembly of the two cylindrical clamp support bodies 360 to form the clamp depicted at 380 in FIGS. 9A and 9B. The seating of the backing plates 342, 344, in the associated backing plate receiving channels 364 overcomes any potential for these backing plates 342; 344 to possibly rotate or shift out of position during assembly of the two cylindrical clamp support bodies 360 to form the clamp 380 depicted in FIGS. 9A and 9B.

Figure 10A:
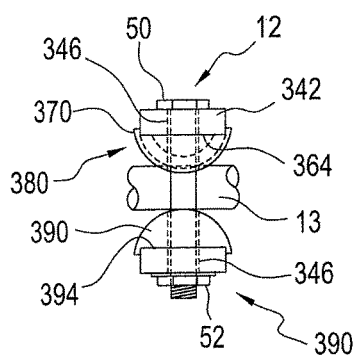
FIG. 10A is an end view of a clamp in accordance with the present invention and utilizing one of the cylindrical clamp support bodies depicted in FIG. 5A and a cylindrical clamp rod.
Figure 10B:
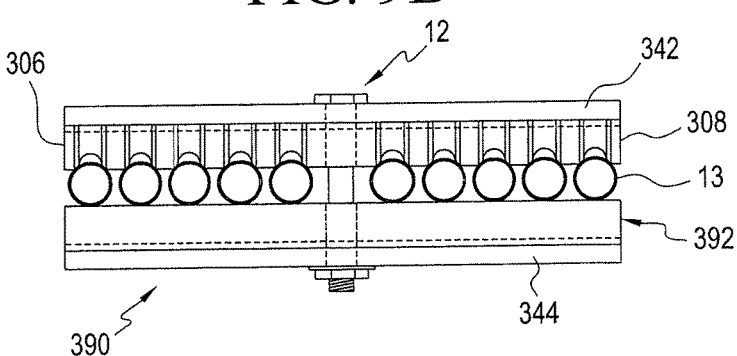
FIG. 10B is a side elevation view of the clamp depicted in FIG. 10A.

FIGS. 10A and 10B depict yet another clamp in accordance with the present invention, generally at 390, which clamp 390 is generally similar to the clamp depicted in FIGS. 8A and 8B, generally at 350. In the clamp 390, which is depicted in FIGS. 10A and 10B, the clamp is configured using one cylindrical clamp support body, such as the one depicted at 360 in FIG. 5A, and using one of the cylindrical clamp support rods 392, similar to the one depicted generally at 352 in FIGS. 8A and 8B. In this clamp embodiment 390, the cylindrical clamp support rod 392 is provided with a backing plate receiving channel 394 which is the same, in structure and function, as the backing plate receiving channel 364 discussed in connection with the embodiment of the present invention depicted in FIGS. 5A, 5B, 5C, 9A and 9B. In the embodiment depicted in FIGS. 10A and 10B, as was the situation with the embodiment depicted in FIGS. 8A and 8B, the cylindrical clamp support body, generally at 360, can be positioned either in the upper or top position, as depicted in FIGS. 10A and 10B, with the cylindrical clamp support rod 392 in the bottom position, or the relative positions of the two components could be reversed. Also, as was discussed above, the overall length of the cylindrical clamp support body 360 and of the cylindrical clamp support rod 392 could be varied in accordance with a number of the tubes 13 that are to be supported and clamped. Also, as was previous discussed, the location of the intermediate land 314 does not have to be centered between the two ends 306, 308 of the cylindrical clamp support body. As will be discussed in connection with the next preferred embodiment, which is depicted generally at 400 in FIGS. 6A, 6B and 6C, as well as in FIGS. 11A and 11B, if the sizes of tubes 13 to be clamped on one side of the intermediate land 314 are different from the size of the tubes 13 to be supported on the other side of the intermediate land 314, the location of that intermediate land may be shifted to balance the load that is imposed on the clamp.

Figures 6A, 6B:
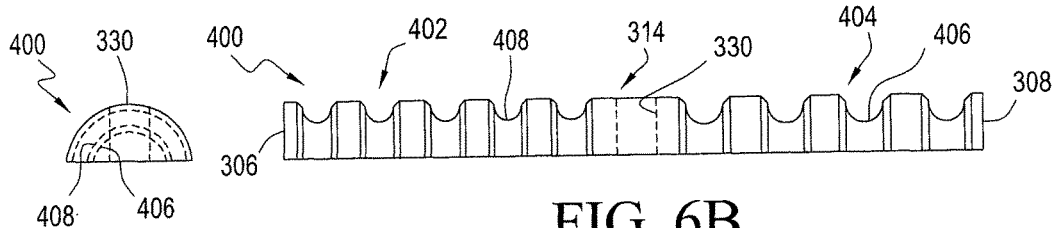
FIG. 6A is an end view of another preferred embodiment of the cylindrical clamp support body in accordance with the present invention.
FIG. 6B is a side elevation view of the cylindrical clamp support body of FIG. 6A.
Figure 6C:
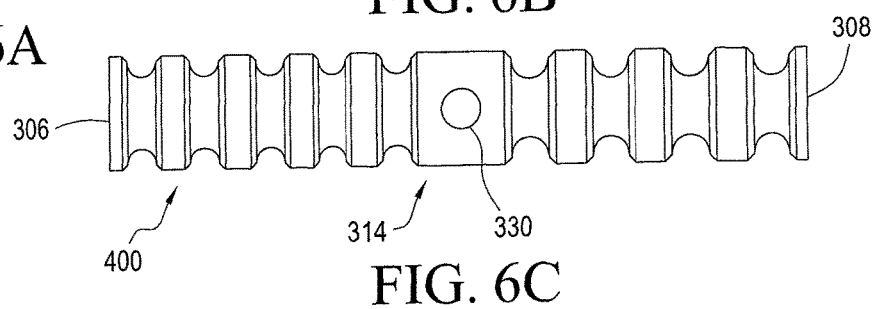
FIG. 6C is a top plan view of the cylindrical clamp support body of FIG. 6A.

A still further embodiment of the cylindrical clamp support body in accordance with the present invention is depicted generally at 400 in FIGS. 6A, 6B and 6C. In this embodiment, the cylindrical grooves 402 have a first effective diameter while the cylindrical grooves 404 having a second effective diameter with the cylindrical grooves 404 have a second effective diameter which, in the configuration depicted in FIGS. 6A, 6B and 6C is less than the diameters of the first cylindrical grooves 402. Since the diameters of the second cylindrical grooves 404 are less, the groove depths of these grooves are greater. Bases 406 of the circular grooves with the reduced diameters 404 are further away from the surface of greatest circumference 14 of the cylindrical clamp body 400 than are the groove bases 408 of the plurality of cylindrical grooves 402 having the larger groove diameter. In other respects, the cylindrical clamp support body depicted generally at 400 in FIGS. 6A, 6B and 6C is essentially the same as a cylindrical clamp support body depicted generally at 300 in FIGS. 4A, 4B and 4C. While the number of circular grooves 312 is less in the FIGS. 4A, 4B and 4C embodiment than is the number of corresponding circular grooves 402 and 404 in the embodiment of the cylindrical clamp support body depicted generally at 400, this difference is not significant. In each of these embodiments, the overall length of the cylindrical clamp support body and the number of grooves, generally at 312 or at 402; 404 that are formed in that clamp support body is a function of intended usage. As has also been discussed above, the intermediate land 314 does not have to be positioned equidistant between the two ends 306, 308 of the cylindrical clamp support body depicted generally at 400 in FIGS. 5A, 5B and 5C.

Figures 11A, 11B:
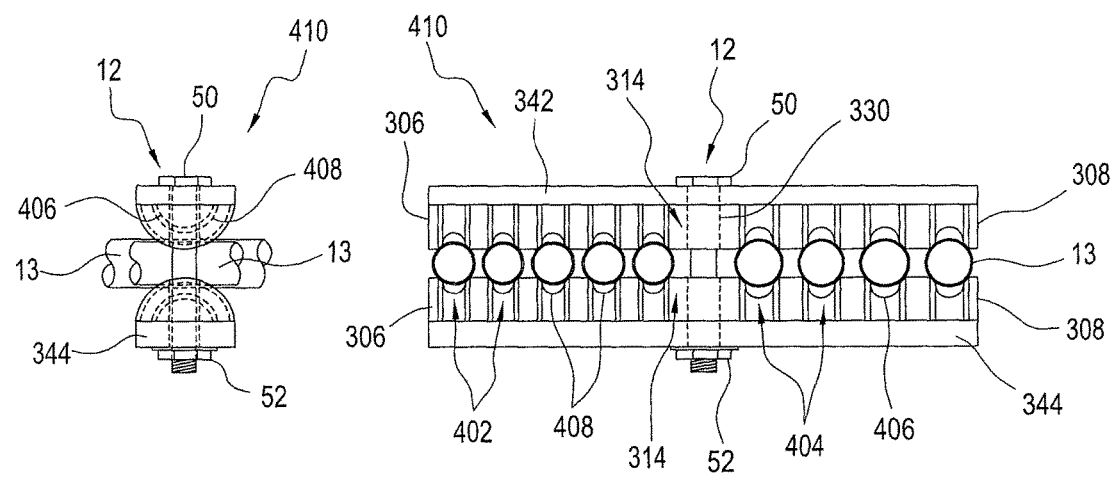
FIG. 11A is an end view of a clamp in accordance with the present invention and utilizing two of the cylindrical clamp support bodies of FIG. 6A.
FIG. 11B is a side elevation view of the clamp depicted in FIG. 11A.

A clamp which utilizes two of the cylindrical clamp support bodies 400, depicted in FIGS. 6A, 6B and 6C, is shown generally at 410 in FIGS. 11A and 11B. This clamp, generally at 410, utilizes two of the cylindrical clamp support bodies 400, each with cylindrical grooves 402 and 404 of differing diameters. As may be seen in FIGS. 11A and 11B, tubes 13 of differing diameters can be clamped between the two cylindrical clamp support bodies 400. In the clamp depicted generally at 410 in FIGS. 11A and 11B, the top backing plate 342 and the bottom backing plate 344 are positioned in contact with a quadrilateral base support surface of each of the cylindrical clamp support bodies, generally similarly to the configuration depicted in FIGS. 7A and 7B. It will be understood that each of the cylindrical clamp support bodies 400 that are used to form the clamp, generally at 410, could also be provided with backing plate receiving channels, such as the ones depicted at 364 in connection with FIGS. 5A, 5B and 5C. Further, it is to be also understood that the clamp, generally at 410 in FIGS. 11A and 11B, could be structured using only one cylindrical clamp support body, generally at 400, and one cylindrical clamp support rod, such as the one depicted at 352 in FIGS. 10A and 10B, for example. All of these variations are within the scope of the present invention.

In accordance with the preferred embodiments of the present invention, the clamp support bodies can be manufactured from metal or plastic cylindrical rods, for example of stainless steel, aluminum or synthetic resin, such as DELRIN™. Teflon or Teflon coatings are also suitable in the manufacture. Using a synthetic resin for the clamp support body prevents dissimilar material contact problems from arising. However, using a material for the clamp support body which matches that of the tubing also prevents dissimilar material contact problems from arising. In some embodiments, the clamp support bodies and the backing plates are manufactured and the holes for accommodating the fasteners, generally at 12, are drilled in the bodies during assembly of the clamp support bodies. The holes may also be pre-drilled at the time of manufacture of the clamp support bodies.

While preferred embodiments of a corrosion reducing minimum contact clamp for supporting and securing tubing, in accordance with the present invention, have been set forth fully and completely hereinabove, it will be apparent to one of skill in the art that changes could be made, without departing from the true spirit and scope of the present invention, which is accordingly to be limited only by the appended claims.

What is claimed is:

1. A clamp for supporting and securing tubing in a clamping system, said clamp comprising:
    a clamp body having a cylindrical shape with an outer circumferential surface and having a longitudinal axis;
    at least a first groove in said clamp body, said at least first groove being formed intermediate first and second ends of said clamp body and having a groove base spaced at a groove depth from said outer circumferential surface, said at least first groove having first and second radially extending, longitudinally spaced groove walls, each of said groove walls being perpendicular to the longitudinal axis and terminating at longitudinally spaced groove inner and outer edges, said longitudinally spaced inner and outer edges of each of said radially extending groove walls forming one of first and second spaced right conical frustum sections, said first and second spaced right conical frustum sections each formed by said spaced outer and inner edges of each of said radially extending groove walls having a frustum section width less than said groove depth and each being spaced from said groove base, each of said first and second right conical frustum sections forming a tube surface engaging support area for engagement with a tube supported by said right conical frustum sections defined by said inner and outer groove edges of said clamp body and spaced from said groove base; and
    a fastener receiving hole intermediate said first and second ends of said clamp body and extending perpendicularly to said longitudinal axis.

2. The clamp of claim 1, wherein the first and second spaced right conical frustum sections of said at least first groove each form a minimum tube surface engaging support area for engagement with a tube.

3. The clamp of claim 1 wherein said groove base is arcuate in a direction of said longitudinal axis.

4. The clamp of claim 1 further including a clamp body land intermediate said first and second ends of said clamp body, said fastener receiving hole being formed in said clamp body land.

5. The clamp of claim 4 further including a plurality of grooves and wherein at least a first one of said plurality of grooves is intermediate said first end of said clamp body and said clamp body land and wherein at least a second one of said plurality of grooves is intermediate said second end of said clamp body and said clamp body land.

6. The clamp of claim 1 further including a quadrilateral base support surface for said clamp body.

* * * * *